US007715780B1

(12) United States Patent
Beamish et al.

(10) Patent No.: US 7,715,780 B1
(45) Date of Patent: May 11, 2010

(54) AUDIENCE RESPONSE SYSTEMS, METHODS AND APPARATUS

(75) Inventors: Darin Beamish, Puyallup, WA (US); Scott Thielman, Seattle, WA (US); George Niederauer, Seattle, WA (US)

(73) Assignee: Qwizdom, Inc., Puyallup, WA (US)

( * ) Notice: Subject to any disclaimer, the term of this patent is extended or adjusted under 35 U.S.C. 154(b) by 1153 days.

(21) Appl. No.: 11/248,391

(22) Filed: Oct. 12, 2005

Related U.S. Application Data

(63) Continuation of application No. 11/220,928, filed on Sep. 6, 2005, now abandoned.

(60) Provisional application No. 60/607,147, filed on Sep. 3, 2004, provisional application No. 60/661,052, filed on Mar. 9, 2005.

(51) Int. Cl.
*H04B 17/00* (2006.01)

(52) U.S. Cl. ............... 455/2.01; 455/517; 455/3.03; 455/419

(58) Field of Classification Search ............. 455/2.01, 455/517, 3.03, 3.04, 3.05, 3.01, 415, 414.1–3, 455/419, 420, 435.1, 457, 463, 458, 466; 725/13, 24; 434/350, 351
See application file for complete search history.

(56) References Cited

U.S. PATENT DOCUMENTS

| | | | |
|---|---|---|---|
| 3,699,667 A | 10/1972 | Gomez | |
| 4,004,354 A | 1/1977 | Yamauchi | |
| 4,622,013 A | 11/1986 | Cerchio | |
| 5,002,491 A | 3/1991 | Abrahamson et al. | |
| 5,226,177 A * | 7/1993 | Nickerson | 725/24 |
| 5,823,788 A * | 10/1998 | Lemelson et al. | 434/350 |
| 2003/0215780 A1 * | 11/2003 | Saar et al. | 434/351 |

OTHER PUBLICATIONS

Donald C. Martin, Hybrid Terminal System for Simulation in Science Education, Fall 1971, pp. 362-363, 365-366, North Carolina State University, Raleigh, North Carolina, USA.
Richard T. Murphy & Lola Rhea Appel, Evaluation of the Plato IV Computer-Based Education System in the Community College, Jan. 1978, pp. 12-14, Plato in Community Colleges, Princeton, NJ, USA.
Andries Van Dam, The Electronic Classroom: Work Stations for Teaching, An Extended Abstract, 1984, p. 59, Brown University, Providence, Rhode Island, USA.
V. K. Kumar, Instructional Uses of the Olin Experimental Classroom, 1976, pp. 189-190, Case Western Reserve University, Cleveland, Ohio, USA.
James Whitescarver, A Network Environment for Computer-Supported Cooperative Work, 1988, pp. 260-262, New Jersey Institute of Technology, New Jersey, USA.

(Continued)

*Primary Examiner*—John Lee
(74) *Attorney, Agent, or Firm*—DWC Law Firm, P.S.

(57) ABSTRACT

A wireless audience response system can have a host unit, presenter device, and a plurality of audience response units with keypads, with the host unit being communicatively coupled to a computer. In some embodiments, the audience response units can be used to execute functions using application programs within the computer remotely. Also, in other embodiments, the audience response units track delay times required for transmitting input data, with the delay times being usable in comparing response times at the host unit.

18 Claims, 7 Drawing Sheets

OTHER PUBLICATIONS

Leslie N. Davis, Jak Eskinazi and Daniel J. Macero, APL As a Teaching Tool: Two Versatile Tutorial Approaches, 1972, pp. 59, 62, 63, Syracuse University, Syracuse, New York, U.

David Freer, Plato Across the Curriculum: An Evolution of a Project, Feb. 1986, pp. 70-71, Journal of the Association of Educational and Training Technology, Johannesburg, South Africa.

Kenneth L. Modesitt, An Excellent Mixture for PSI: Computer Science, PLATO, Knowledge Levels., 1975, pp. 89-91, Purdue University, Purdue University at Fort Wayne, USA.

Morteza Bahar, Implementation of an Information-Retrieval Based CAI System, Aug. 31, 1977, pp. 23-25, University of Illinois Department of Computer Science, Urbana, Illinois.

R.H. Terlet, The CRT Display Subsystem of the IBM 1500 Instructional System, Fall 1967, International Business Machines Corporation, Los Gatos, California.

* cited by examiner

AUDIENCE RESPONSE SYSTEMS, METHODS AND APPARATUS

CROSS-REFERENCE TO RELATED APPLICATION(S)

This application is a continuation of U.S. patent application Ser. No. 11/220,928, filed Sep. 6, 2005.

BACKGROUND OF THE INVENTION

1. Field of the Invention

The present invention relates to audience response systems for use in wireless audience participation.

2. Description of Related Art

Audience response systems or audience participation systems typically include a host unit or base unit connected to a computer or other processing device, and a plurality of remote devices or audience response units with keypads. The audience response units can be used by audience members to input information or commands for transmission to the host unit via a wired or wireless communication link.

Wireless audience response systems, including infrared and radio frequency (RF) systems, have advantages over hard-wired systems, such as portability and flexibility. Also, the reliability and available features of wireless audience response systems continue to improve and grow, lending to a wider array of applications and increased rate of implementation. The wide array of applications include those in education (in class room environments at all levels of education) and various types of business and seminar or presentation environments. In these environments, audience members can respond to inquiries or transmit other types of information at their selection, using an audience response keypad, while simultaneously interacting both visually and verbally in the physical audience environment. The transmitted responses (or other types of information) can be immediately analyzed via a computer or other processing device. The analysis can comprise displaying graphical tables, graphs or charts on a computer monitor or other display device. Also, audience response systems are often used to administrate or deliver tests, quizzes and surveys, etc, or to play educational games, wherein responses to inquiries can be immediately graded, checked or analyzed. Although a comprehensive discussion of all applications cannot be provided here, the applications are wide ranging and indeed, they continue to grow. In part because of the wide-ranging applicability of these systems, there is a need to continue to improve features and reliability to fulfill needs in different environments.

BRIEF SUMMARY OF THE INVENTION

In some embodiments of the present invention, a wireless audience response system is provided having a plurality of audience response units, at least one host unit and at least one RF transceiver module provided within each of the host unit and audience response units. The audience response units can execute a transmission protocol which may require collision avoidance procedures. The transmission protocol can cause unpredictable delay time in transmission processes, and the delay time can be tracked in the audience response unit and transmitted to the host unit with a transmission. The tracked delay time can be used for accurate comparison or determination of audience response times to inquiries.

In other embodiments of the present invention, the audience response system is configured such that a set of input data can be transmitted to the host unit from an audience response unit, for analysis using a computer, or other processing device coupled to the host unit. The analysis can include checking and modifying the input data and transmitting at least a portion of the input data back to the audience response unit, for display on a dedicated display device thereof. The modified input data can be text or graphical images, which are sent back to the audience response unit in modified form.

In another embodiment of the present invention, the audience response units are provided with touch sensitive display screens.

Also, in further embodiments of the present invention, calendaring and scheduling functions are provided, which can be used by audience members during network activity and off-network activity. Calendaring or scheduling information can be transmitted to the audience response units during network activity, in the context of using the audience response system for responding to inquires.

DETAILED DESCRIPTION OF THE INVENTION

In the following description, certain specific details are set forth in order to provide a thorough understanding of various embodiments of the invention. However, upon reviewing this disclosure one skilled in the art will understand that the invention may be practiced without many of these details. In other instances, well-known or widely available structures, hardware, software and wireless protocol and standards associated with implementation of network layers, from physical to medium access control, and network applications, application program interfaces and application programs have not been described in detail to avoid unnecessarily obscuring the descriptions of the embodiments of the invention.

The discussion below discloses, among other things, using the present invention in the area of wireless audience participation using lower power wireless networking in a primarily star configuration. However, as will be understood by one skilled in the art after reviewing this disclosure, various other configurations are contemplated.

The terms "audience member," "student" and "user" are all used herein in an interchangeable sense to describe persons using the audience response unit 4, unless the context indicates otherwise.

Figure 1:
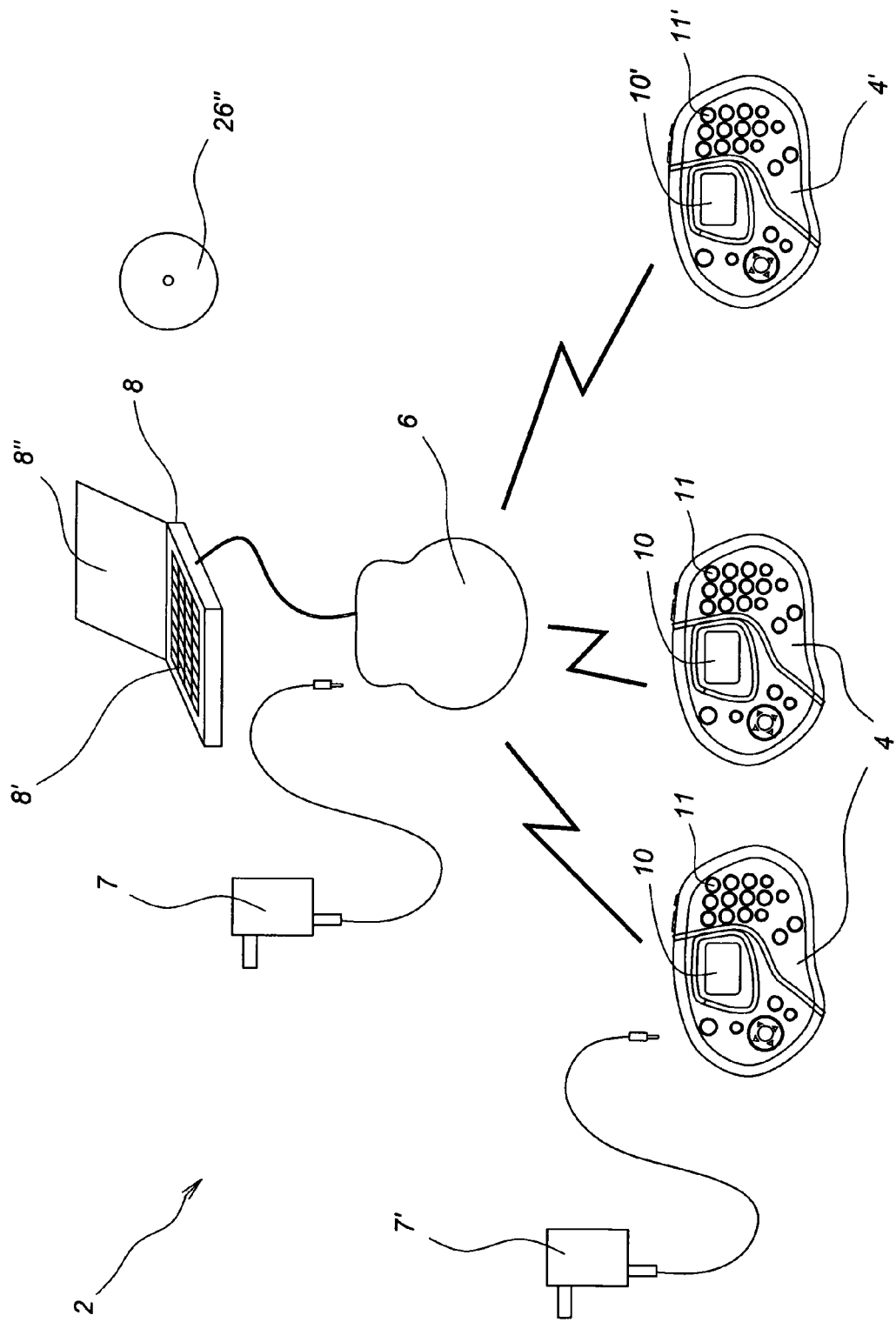
FIG. 1 is a diagram showing components of an embodiment of the audience response system of the present invention.

In some embodiments of the present invention an audience response system 2 is provided, having one or more audience response units 4 and a host unit 6, as can be seen in FIG. 1. The host unit 6 may be communicatively connected to a personal computer (PC) 8, including, for example, a laptop or desktop PC, normally having a keyboard 8', mouse or pointer, monitor or display device 8", CPU, hard drive, and a device for reading instructions or data from a computer readable medium (the PC 8 is illustrated generally without specifically illustrating some internal and external components that are common and widely implemented in enabling the function of PC's). A wireless communication link is provided between the audience response units 4 and the host unit 6 by one or more radio frequency (RF) modules. In some embodiments, the RF modules are IEEE 802.15.4 compliant.

Figure 3:
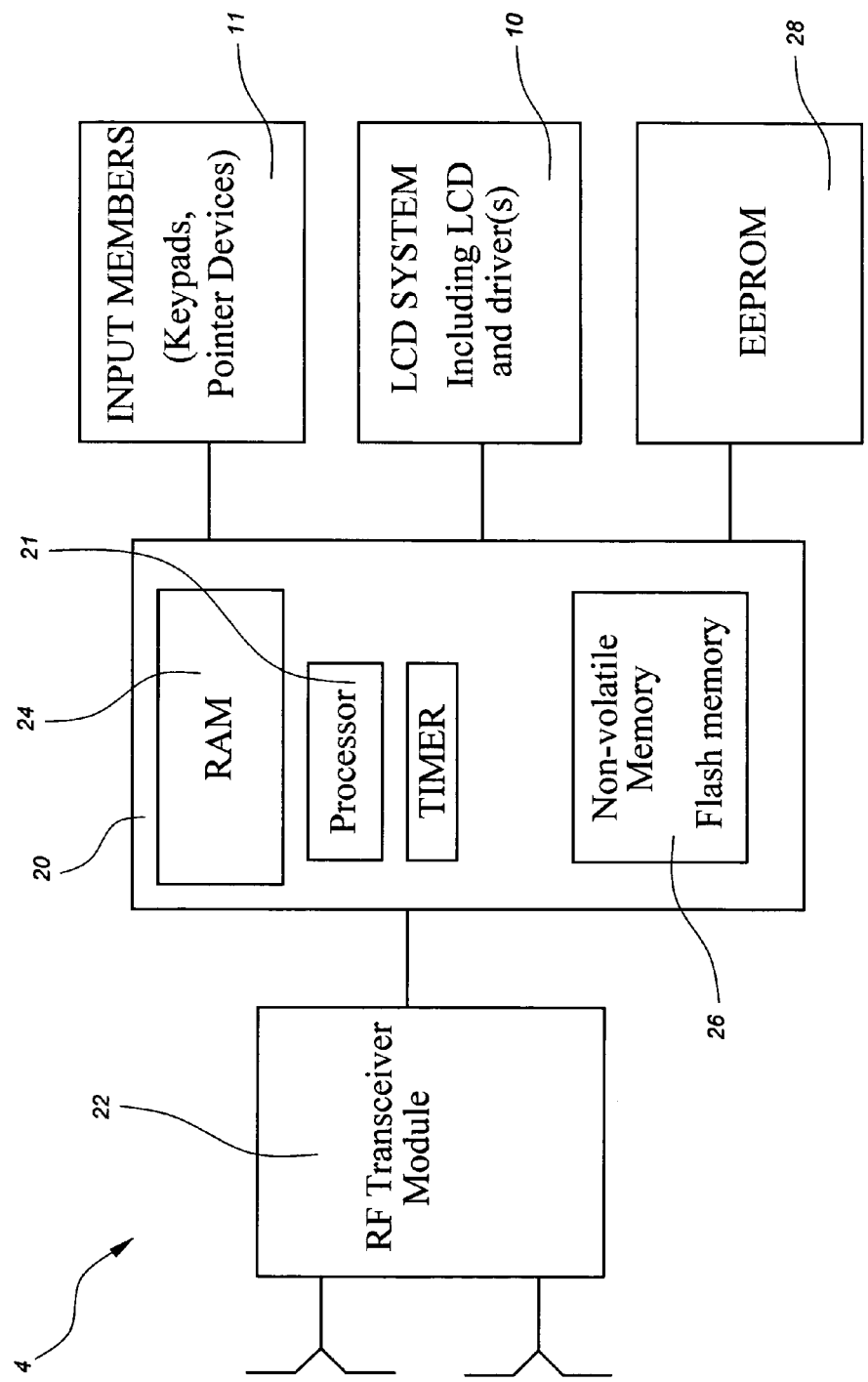
FIG. 3 is a simplified block diagram of certain components of the audience response units of FIGS. 2a & 2b.

Various embodiments of the audience response units 4 (also referred to herein as "portable units" or "remotes") can be provided including that illustrated as a simplified block diagram in FIG. 3, which comprises a display, such as an LCD 10 (liquid crystal display), input members 11 (e.g. manually operable input members such as, without limitation, keys, buttons, switches and pointers), an RF transceiver unit or module 22 and a microcontroller 20 having a processor 21, along with integral or peripheral RAM 24, writable non-volatile memory 26, such as flash memory, and EEPROM 28.

The RF transceiver 22 can be a low power and short range transceiver, such as, without limitation, the MC13191 or MC13192 transceivers by FREESCALE SEMICONDUCTOR, with each transceiver being coupled to a master device (e.g., processing module or microcontroller) within each respective unit 4, 6. The RF transceiver 22 and design of the microcontroller 20 for each unit is selectable based on application requirements in audience response system 2; however, some embodiments of the present invention utilize the MC13192 coupled to an 8-bit microcontroller (MCU). Suitable 8-bit microcontrollers can include the FREESCALE SEMICONDUCTOR MC9S08GT and MC9S08 GB series. Various other widely available substitute processors/controllers and RF transceiver modules can be employed in the present invention to meet processing requirements depending on the application.

As will be appreciated by one skilled in the art, the described wireless communication link can be specified and configured to support various networking topologies, depending on the particular application. In a first embodiment, the audience response system 2 is configured in a "star topology" with a network coordinator, or host unit 6. The host unit 6 may be a full function device or connected to a full function device, with the host unit 6 having an RF module coupled to a microcontroller or processor, and with the RF module and controller comprising same or similar hardware components as the audience response units 4. In addition, the host unit 6 can be coupled to a personal computer 8, which can be used for processing input data entered via the audience response units 4 by audience members and for executing specific applications software or other programs for use within the audience response system 2 to define and operate an application environment of the audience response system 2.

The transmissions processes within the disclosed audience response system 2 can comprise a beacon mode with contention access periods and, in some embodiments, collision free periods within guaranteed time slots. Alternative embodiments can be implemented in a non-beacon mode. The audience response units 4 can "check-in" to transmit signal packets or to receive signal packets from the host unit 6 using a procedure involving carrier sense multiple access with collisions avoidance (CSMA-CA), as will be appreciated by those skilled in the art after reviewing this disclosure. In other embodiments, transmissions can employ other variations of clear channel assessment processes with or without a randomized back-off.

Figure 2A:
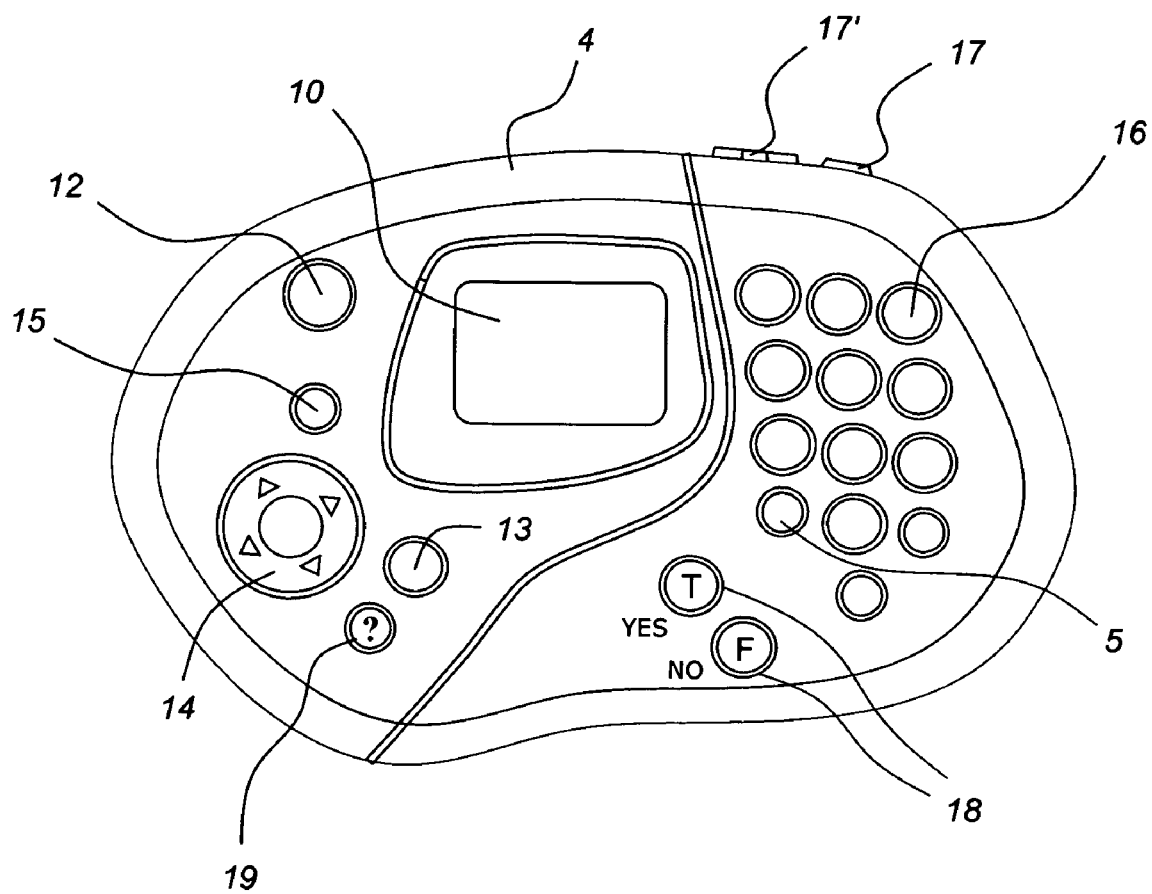
FIG. 2a is an overhead plan view of an audience response unit (portable unit) for use with some embodiments of the present invention.
Figure 2B:
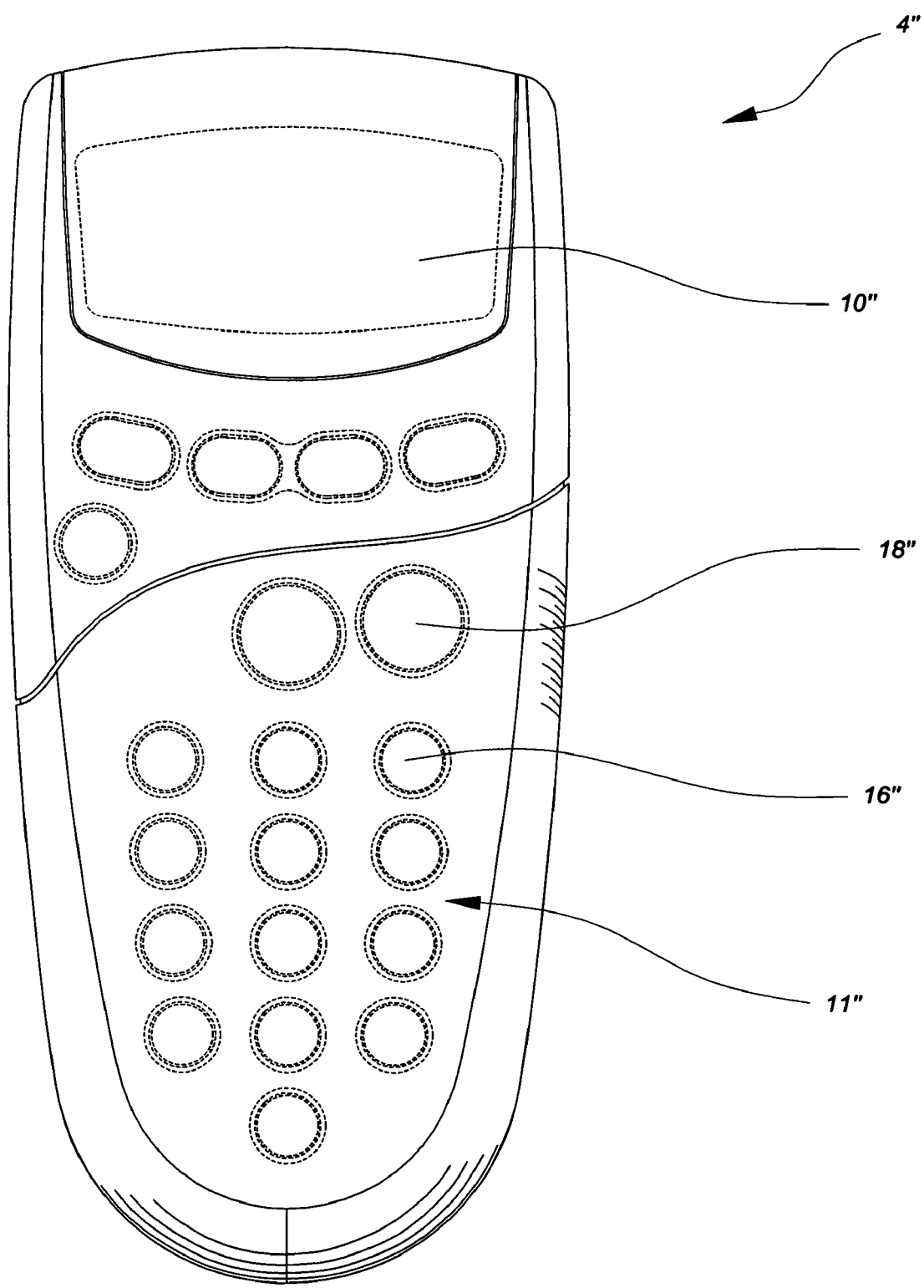
FIG. 2b is an overhead plan view of an alternative embodiment of an audience response unit for the present invention.

Referring to FIG. 2a, an embodiment of the audience response unit 4 is illustrated having various manually operable input members 11 which can include input members 12, 13, 14, 15, 16, 17, 17', 18 and 19, including a multidirectional cursor key 14, in the embodiment illustrated in FIG. 2a, and an alphanumeric keypad 16. Some input members 11 can be configured as designated keys 18 that are signified by permanent markings on the keys or a surface of the portable module 4, such as, for example, "YES" or "NO" markings along with "T" or "F" 18 (signifying "TRUE" or "FALSE" in some embodiments) to simplify action required by a user to input responses to certain inquiries posed within the audience response system 2. An alternative embodiment for an audience response unit 4" of the present invention is also illustrated in FIG. 2b, which can have reduced keypad space but with substantially similar functional components to those illustrated in the block diagram of FIG. 3 for the embodiment in FIG. 2a.

In the embodiment of FIG. 2a, the multidirectional cursor key 14 can be used to control a cursor illustrated on a graphical user interface (GUI) (not drawn) on the display device 10 of the audience response unit 4, in order to provide input to the microcontroller 20. In some embodiments the multidirectional cursor can be used to scroll through GUI menu systems, or select input parameters, all of which are displayable by a display device 10 (e.g., LCD) of the audience response unit 4. Alternatively, or in conjunction with the multidirectional cursor key 14, the alphanumeric keypad 16 and other input members 11 can also be used to provide user input to the microcontroller 20.

As will be appreciated by those skilled in the art, in some embodiments, one or more applications or programs executed by the PC 8 to define an application environment of the audience response system 2 can also be configured to allowing users to preprogram activities, such as those involving questions or inquiries to be posed to audience members. Inquiries can be displayed on the LCD 10 of the audience response units 4 via communication through the host unit 4 and in other embodiments, the inquiries are displayed on a commonly viewable display device visible to all audience members, such as a display screen of the PC 8 or a collateral display device, such as a projection device (not illustrated) coupled to the PC 8. In other embodiments, combinations of different display devices are used.

The host unit 4 can transmit information or instruction to the audience response units 4 to coordinate operation on one or more audience response units 4. For example, graphical user interfaces (GUIs) displayable on the LCDs 10' of the audience response units 4 can be coordinated through signals received from the host unit 4. Also, when certain types of inquiries are presented by an application running within the audience response system 2, various input members 11 of the audience response unit 4 can be rendered inactive or active.

In some embodiments of the present invention, one or more the audience response units 4 can be a presenter device 4' that can be used by a presenter to operate the audience response system, including remotely controlling an application program executed within the PC 8. The presenter device 4' may have identical or similar hardware components to the other audience response units 4 or may comprise more sophisticated processing capabilities with larger memory. In some embodiments, the presenter device 4' can display overview graphical, statistical, summary and "private" information on a dedicated LCD 10'. Also, the presenter device 4' can receive response data communicated from the host unit 6, and can process data within a dedicated processor located within the presenter device 4'.

It is often desirable to gauge, measure or compare response times of audience members or users, to inquiries, as will be appreciated by those skilled in the art. Examples include, without limitation, comparing or determining response times to inquiries posed in testing, surveys, games, quizzes or "on-the-fly" questions or inquiries ("on-the-fly" inquiries include those inquires posed by a presenter without being preprogrammed in the audience response system 2, such as verbally spoken questions). In some embodiments, the actual time for response is desired to be determined or measured, while in other embodiments, only a comparison of response times is desired, such as, for example, to ascertain who responded first in an educational game activity in a class room environment. In both cases, it can be beneficial therefore to track transmission delay times at the audience response units (The "delay time" is the time period required for successful transmission of a response after receiving an input from a user. Such delays can be due to collision avoidance protocols executed by the audience response units). However, when only relative response times are desired for comparison purpose (such as to ascertain who responded first), it is not necessary to precisely synchronize a counter with the presentation of an inquiry. Rather, a time of receipt of each transmission from the audience response units 4 can be monitored, and then corrected or adjusted using transmitted delay times in order to reflect the time at which data was input into a corresponding audience response unit 4. However, when it is desired to determine or measure a response time (i.e. the time between presentation of an inquiry and the time at which a user enters a response), a host unit 6 timer can be synchronized with the start of an inquiry, to offer precision. In such embodiments, the response time for each audience member may be measured or determined as the tracked elapsed time at the host unit 6 minus a delay time transmitted by the corresponding audience response unit 4.

Figure 4:
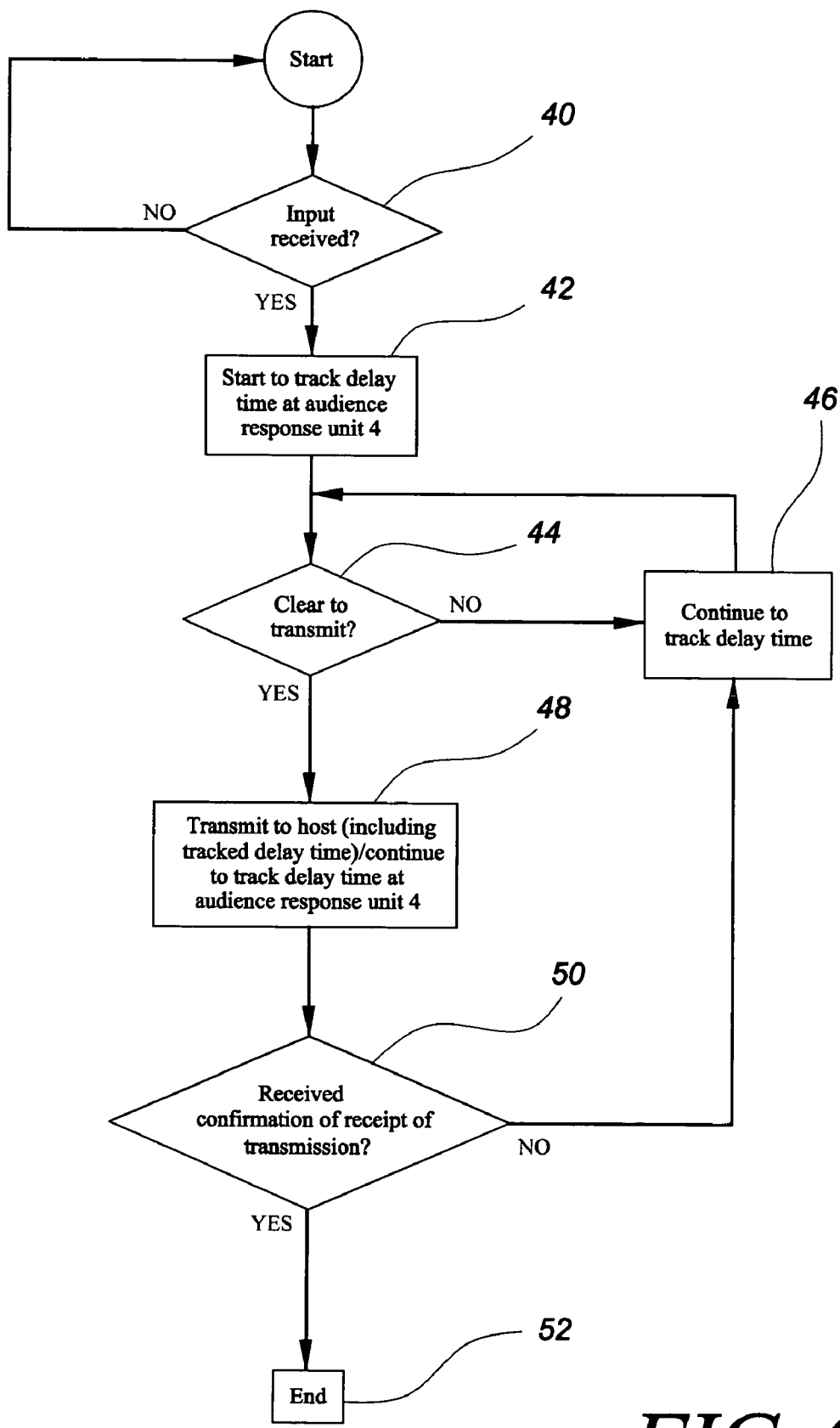
FIG. 4 is a flow diagram for an embodiment of the present invention as executed by an audience response unit.
Figure 5:
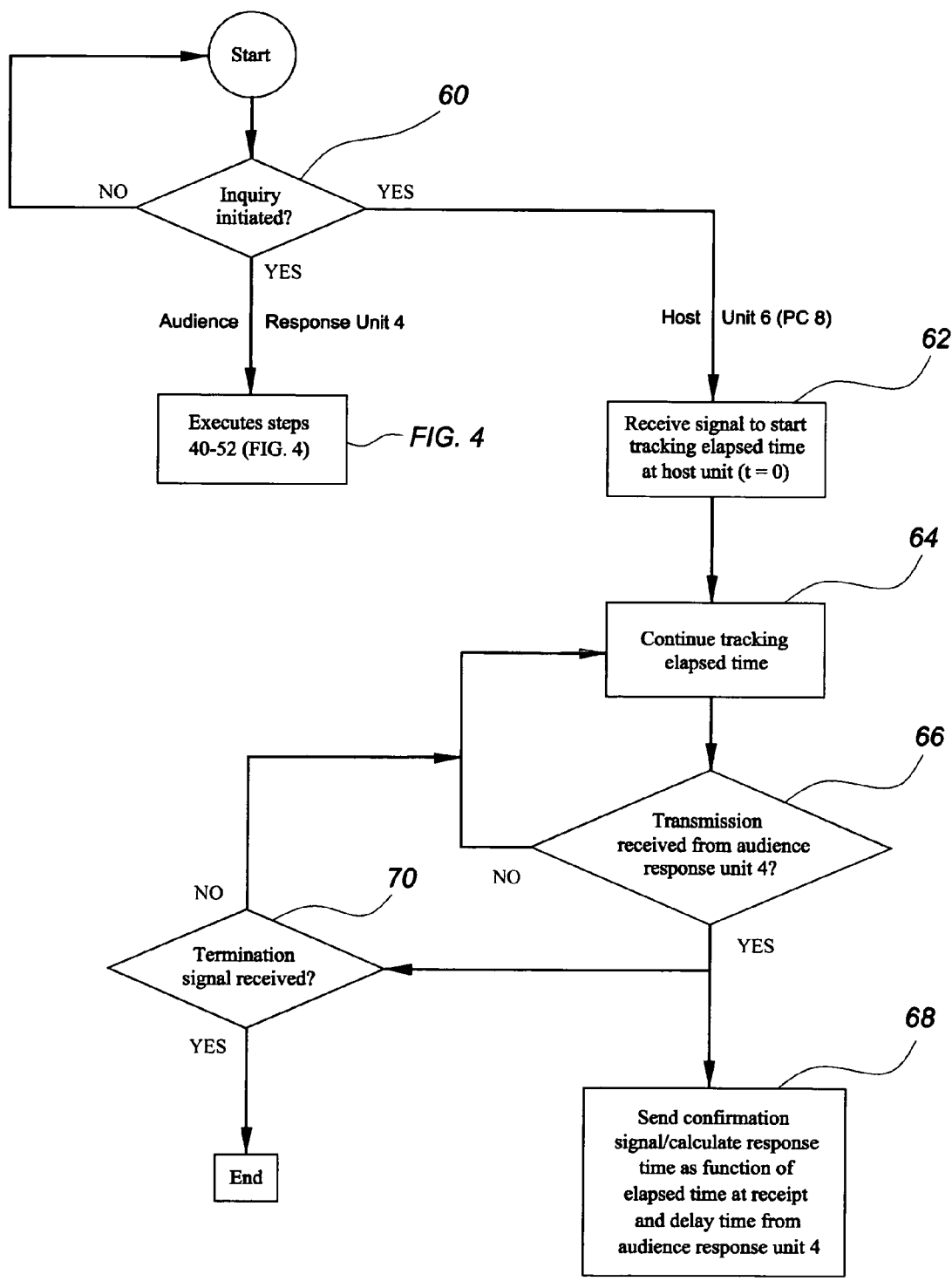
FIG. 5 is a flow diagram for an embodiment of the present invention as executable using both an audience response unit and a host unit in communication with the audience response unit.

Thus, referring to FIG. 4 which illustrates an embodiment of a method of the present invention executed at an audience response unit 4, once a user initiates a response or message for transmission by depressing an input member at step 40, a delay time is tracked using a counter within the audience response unit 4 at step 42. The delay time is then continually tracked and when transmission occurs, via steps 44 & 48, the current total tracked delay time is sent with the transmission by the audience response unit 4. If no confirmation of receipt of the transmission is received from the host unit 6 at step 50 within a designated time frame, the audience response unit 4 can again execute steps 44 through 50, until a confirmation of a successful receipt of transmission is received (In some embodiments, no acknowledgement is transmitted and the process terminates after step 48). Also, it is noted that on subsequent attempts at transmission, the audience response unit 4 continues to track delay time (step 46) and to send an updated tracked delay time (step 48) with each transmission attempted, and can attempt transmission as many times as dictated by any particular transmission protocol in effect. A method has therefore been described for tracking and sending delay times from the audience response unit 4 which can be used for comparing response times—as described above—, and which can also be used as part of another method of the present invention for determining (measuring) response times, as now described:

Referring to FIG. 5, in another embodiment of the present invention, for measuring a response time, an inquiry is presented through the audience response system 2, at step 60 and a timer start signal is provided to the host unit 6, at step 62. The host unit 6 continues to track elapsed time since the start of the inquiry (step 64). If a transmission is received from an audience response unit 4, step 66, the host unit 6 sends confirmation back to the audience response unit 4 from which the transmission was received, as shown in step 68. Also, in some embodiments, the host unit 6 can be instructed to terminate the method, at step 70, such as when all responses have been received, otherwise, it can continue to track elapsed time at step 64 in relation to other transmissions to be received, until termination at step 70. The host unit 6 (or a connected processing device) can be used to determine the actual response times as a function of the elapsed time at the host unit 6 minus a corresponding delay time transmitted from an audience response unit 4.

Lastly, as will be appreciated by those skilled in the art, in other alternative embodiments, response time to an inquiry can be counted directly in the audience response units 4 by sending a start count signal to the audience response units 4 from the host unit 6, with the start count signal being synchronized to initiation of an inquiry. The response time can then be directly counted at the audience response units 4, as the time between receipt of the start count signal to the time at which a user enters an input. The counted response time can then be transmitted to the host unit 6.

In further embodiments of the present invention, one or more of the audience response units 4 includes off-network calendar and schedule function capabilities, and can receive and store calendar or schedule information transmitted from the host unit 6, as will be appreciated by those skilled in the art upon reviewing this disclosure. An application component or module, can be provided within a memory of the audience response units 4 for execution on the audience response unit 4 for interfacing with a calendar application executable by the presenter device 4' or on the PC 8, or both. The calendar application components or modules can be configured to allow a presenter or teacher to designate certain dates or times to be transmitted to and stored within a memory of the audience response units 4. The time or date information can include, without limitation, assignment due dates, test dates, and any other time dependent information as designated by a presenter or teacher. The audience response units 4 can receive and download the time or date information to be displayable on the LCD's 10 thereof, in monthly, weekly, or daily formats, and on a graphical calendar display.

Furthermore, some messages or transmissions made using the audience response system 2 can be encoded to be privately displayed on an LCD 10, 10' of the one or more audience response units 4, or the presenter device 4'. The private messages may be, among other things, a request for help by a particular student, or a message of any type. In some embodiments of the present invention, dedicated input members, such as the "help" key 19 (See FIG. 2), or a graphical user interface (GUI) selection (such as an icon or selection on a menu) can be configured such that when actuated or selected, a pre-designated private message is sent to one or more particular audience response units 4 or the presenter device 4'. Also, the pre-designated message can be a preprogrammed character, icon or graphic that is privately displayed on the presenter device 4", such as a symbol or indicia indicative of a request for help sent by a particular student, or through a particular audience response unit 4.

In addition, some activities conducted using the audience response system 2 can involve the display of information on a commonly viewable display (e.g., on a commonly viewable display device, such as a PC monitor, or on a plurality of LCDs 10 of the audience response units 4), while certain "private" types of information or messages are simultaneously displayed on a particular audience response unit 4 only. This flexibility in presenting private display information in combination with common or non-private information on a commonly viewable display, can be beneficial in a plethora of contexts, as will be appreciated by those skilled in art after reviewing this disclosure.

In various embodiments of the present invention, audience members can use the audience response units 4 to transmit input data for edit, grading or modification using an application in the PC 8, wherein multiple results are transmitted back to the corresponding audience response units 4 for display on a dedicated LCD 10 thereof. For example, inputted text (or characters) can be transmitted to the host unit 6 for grammar or spell check by an application program or component executable in the PC 8, or in some embodiments, the presenter device 4', or host unit 6. The application program checks the text and modifies it by editing, annotating or comment. A modified version of the text, or the spelled checked or grammar checked version is transmitted back to a corresponding audience response unit 4 from which it originated, using the address of the audience response unit 4, for the audience member to view on the dedicated LCD 10 thereof. In some embodiments of the present invention, the audience members can initiate and submit the input data to the PC 8 or presenter device 4', through the audience response unit 4, and also send a command to execute any of the above described functions for modifying or checking the input data or text that they transmit.

In addition, collateral or additional typing or writing devices can be provided that are in communicative connection with the audience response units 4 and presenter device 4'. Examples include providing one or more keyboards, that can be coupled to the audience response unit 4, presenter device 4', host unit 6 or PC 8. In some embodiments, the keyboards are wireless keyboards, as will be appreciated by those skilled in the art.

Figure 6:
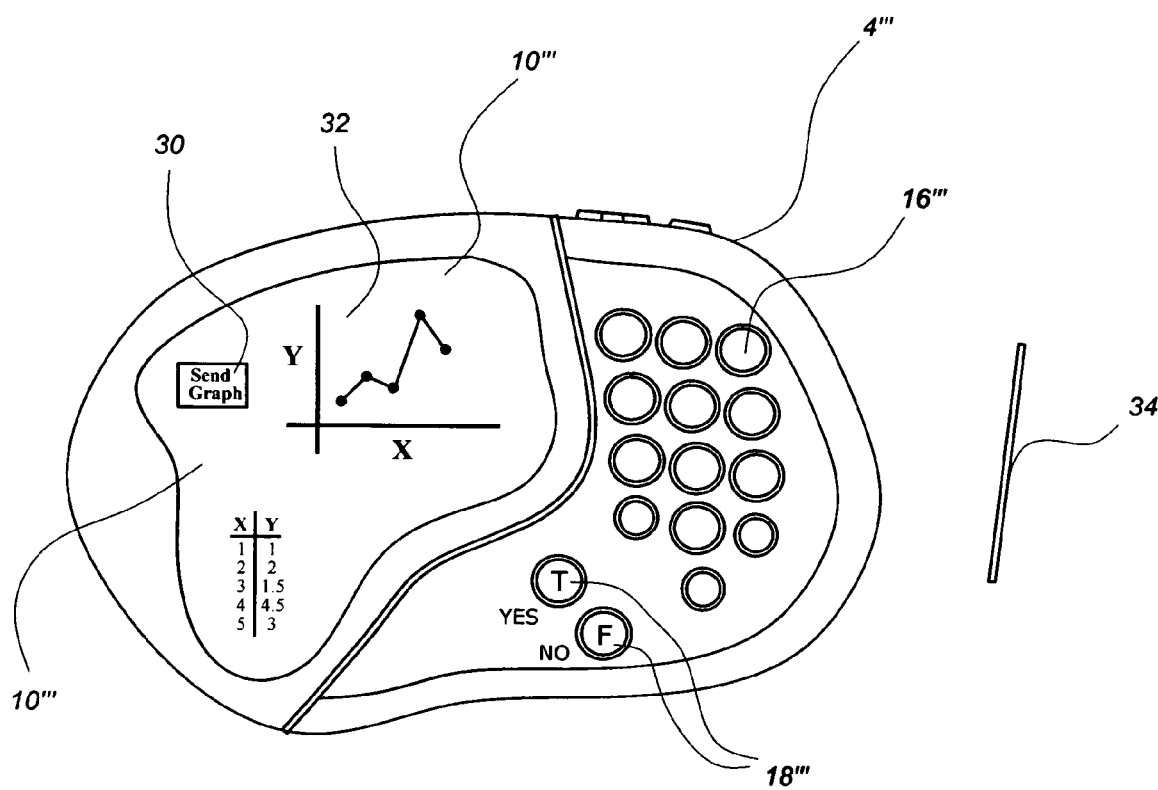
FIG. 6 is an overhead plan view of an embodiment of an audience response unit of the present invention having a touch sensitive display device.

Referring to FIG. 6, the audience response unit 4''' can incorporate touch sensitive screens that allow users to input information through the display system 10''' in place of, or in conjunction with, the use of input members 11. The touch sensitive screen 10''' can be enlarged to provide more display and input surface area. Various touch screen systems which can be utilized include, without limitation, resistive or capacitive systems, as will be appreciated by those skilled in the art after reviewing this disclosure. In such embodiments, audience members can solve problems, or respond to inquiries posed by a presenter in a graphical manner, such as by drawing pictures, writing with a stylus 34, plotting graphs 32, annotating or otherwise marking, directly on the touch sensitive screen 10'''. As with the checking and modification of input data or text information, disclosed supra, users can transmit image information, such as coordinate data from a graph prepared by a student, for the purpose of display or processing, by the PC 8, or other connected device. A presenter can make multiple annotations on the same graph as generated at the presenter device 4' or PC 8, and transmit the annotations back to the corresponding audience response unit 4'''.

The above mentioned U.S. patent applications, U.S. provisional patent application Ser. No. 60/607,147, filed Sep. 3, 2004 and U.S. provisional patent application Ser. No. 60/661,052, filed Mar. 9, 2005, are all incorporated herein by reference in their entirety.

Although specific embodiments and examples of the invention have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A wireless audience response system comprising:
   a plurality of audience response units;
   at least one host unit; and
   at least one RF transceiver module provided within each of the host unit and audience response units, with at least one audience response unit being configured for tracking delay time after sending a transmission until a confirmation of receipt of transmission is received from the host unit, and wherein if no confirmation of receipt is received, the at least one audience response unit sends an updated tracked delay time to the host unit with a next attempted transmission.

2. The wireless audience response system of claim 1 wherein the at least one audience response unit is configured to execute a clear channel assessment prior to transmission and said tracked delay time includes the time period used for said clear channel assessment.

3. The audience response system of claim 1 wherein at least one of the host unit or a peripheral counter is configured to track an elapsed time.

4. The audience response system of claim 3 wherein the host unit can initiate an elapsed time count that is synchronized with the start an inquiry presented through the audience response system.

5. The audience response unit of claim 4 wherein at least one of the host unit and a peripheral processor is configured to calculate a response time as a difference between the total tracked elapsed time at receipt of the transmission and the total tracked delay time as transmitted by the at least one audience response unit.

6. A wireless audience response system comprising:
   a plurality of audience response units;
   at least one host unit;
   at least one RF transceiver module provided for each of the host unit and audience response units; and
   at least one processor communicatively coupled to the host unit, wherein the audience response system is configured such that a set of input data can be transmitted to the host unit from at least one of said audience response units to be check and modified using the processor, and wherein the results of the checking and modification can be transmitted back to the at least one of the plurality of audience response units with at least a portion of the set of input data being transmitted back and with other portions of the set of data being modified.

7. The audience response system of claim 6 wherein checking and modifying comprises conducting a spelling and grammar check and modifying spelling and grammatical errors.

8. The audience response system of claim 6 further comprising a touch sensitive display.

9. The audience response system of claim 6 wherein modifying the set of input data comprises annotating a set of characters or a graphical image.

10. The audience response system of claim 6 wherein modifying the input data comprises deleting portions of an image represented by the set of input data and replacing the deleted portions with new data for modifying the image.

11. The audience response system of claim 6 wherein the modified portions of the set of data have been modified manually by a presenter.

12. The audience response system of claim 6 wherein modifying the set of input data can be controlled by a presenter device.

13. A method of interacting with an audience using an audience response system comprising the following steps in any order:
   posing inquiries to the audience;
   collecting responses to inquiries from the audience members through a host unit coupled to a processor; and
   permitting audience members to use the audience response units to access the processor to execute a remotely stored program for checking and modifying input data entered by the audience members and to receive the modified input data back to the audience response units.

14. The method of claim 13 wherein the remotely stored program is an application component or module usable for checking grammar and spelling.

15. A wireless audience response system comprising:
   a host unit;
   a plurality of audience response units, each being configured to be in wireless communication with the host unit and each having a dedicated display; and
   a dedicated input member or graphical user interface selection provided on at least one of the audience response units selectable for actuating a transmission encoded for private display on a presenter device, another of the audience response units, or another display; and
   a commonly viewable display device that is unattached to any of the plurality of audience response units or presenter device, wherein each of the commonly viewable display device, dedicated display devices of the audience response units, and presenter device can display different information simultaneously.

16. The wireless audience response system of claim 15 wherein the at least one audience response unit is programmable by a user to reconfigure the dedicated input member or graphical user interface selection to be associated with initiating a transmission encoded for private display on a presenter device or an audience response unit.

17. The wireless audience response system of claim 15 wherein transmission for private display comprises a preprogrammed character or graphic displayed on the presenter device indicative of a private help request by an audience member.

18. A wireless audience response system comprising:
   a plurality of audience response units;
   at least one host unit; and
   at least one RF transceiver module provided within each of the host unit and audience response units, with at least one audience response unit being configured to track a delay time for sending a transmission and wherein the at least one host unit or a peripheral counter is configured to track an elapsed time, the host unit can initiate an elapsed time count that is synchronized with the start of an inquiry presented through the audience response system and at least one of the host unit and a peripheral processor is configured to calculate a response time as a difference between the total tracked elapsed time at receipt of the transmission and the total tracked delay time as transmitted by the at least one audience response unit.

* * * * *